United States Patent
Phillips et al.

(10) Patent No.: US 8,348,681 B2
(45) Date of Patent: Jan. 8, 2013

(54) CABLE ASSEMBLY

(75) Inventors: Michael J. Phillips, Camp Hill, PA (US); Michael E. Cowher, Harrisburg, PA (US); Matthew D. Morrison, Halifax, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 276 days.

(21) Appl. No.: 12/762,968

(22) Filed: Apr. 19, 2010

(65) Prior Publication Data

US 2011/0255830 A1    Oct. 20, 2011

(51) Int. Cl.
*H01R 13/648* (2006.01)
(52) U.S. Cl. ....................................................... 439/99
(58) Field of Classification Search .................. 439/99, 439/98, 446, 464, 471
See application file for complete search history.

(56) References Cited

U.S. PATENT DOCUMENTS

| 7,074,087 | B2 | 7/2006 | Szczesny et al. | |
| 7,442,072 | B2* | 10/2008 | Droesbeke et al. | 439/471 |
| 7,534,125 | B1 | 5/2009 | Schroll | |
| 2007/0224876 | A1* | 9/2007 | Droesbeke et al. | 439/460 |
| 2007/0275591 | A1* | 11/2007 | Weber | 439/460 |
| 2009/0227133 | A1* | 9/2009 | Zhang et al. | 439/160 |

* cited by examiner

*Primary Examiner* — Tulsidas C Patel
*Assistant Examiner* — Phuongchi Nguyen

(57) ABSTRACT

A cable assembly includes a housing having a mating end and a cable end and receives a cable through the cable end. The housing has a mounting block proximate to the cable end. A ferrule is configured to be terminated to the cable. The ferrule has an inner bushing and an outer bushing, with the inner and outer bushings cooperating to capture a cable braid of the cable therebetween. The ferrule is retained within the mounting block such that the ferrule is housed interior of the housing.

19 Claims, 3 Drawing Sheets

CABLE ASSEMBLY

BACKGROUND OF THE INVENTION

The subject matter herein relates generally to cable assemblies, and more particularly, to termination features of cable assemblies.

Various types of fiber optic and copper based cable assemblies that permit communication between electronic host equipment and external devices are known. These cable assemblies may be in the form of transceivers that are incorporated into modules that can be pluggably connected to the host equipment to provide flexibility in system configuration. The modules are constructed according to various standards for size and compatibility, one standard being the Small Form-factor Pluggable (SFP) module standard. In one particular application, the transceiver is plugged into a receptacle that is mounted on a circuit board within the host equipment. The receptacle includes an elongated guide frame, or cage, having a front that is open to an interior space, and an electrical connector disposed at a rear of the cage within the interior space. Both the connector and the guide frame are electrically and mechanically connected to the circuit board, and when a transceiver is plugged into a receptacle it is electrically and mechanically connected to the circuit board as well.

The transceivers are used in systems that are configured to operate at different electrical speeds. Typically, higher speed systems utilize larger cables, and the transceivers are designed differently to accommodate the different sized cables. It is costly to manufacture a family of different transceivers because a different mold is required for each different design. Additionally, some transceivers are copper based, while others are fiber optic based. Both types of transceivers require a different architecture to support and connect to the particular size cable.

Known transceivers suffer from other drawbacks including incorporation of a cable strain relief that extends well beyond the housing of the transceiver. The cable strain relief typically surrounds the termination of the cable braid to the housing. For example, the cable braid may be wrapped around a boss extending from the back end of the housing, and the strain relief is connected over such termination. Having the termination and the strain relief external to the housing increases the overall length of the assembly. Additionally, the cable strain relief is typically fairly rigid and not easily bent. Having the cable strain relief extending well beyond the back end of the housing increases the straight line distance that the cable extends from the front of the transceiver. Having a long cable straight line distance from the front of the transceiver is problematic in that cable management is difficult and the overall space taken by the system is larger.

A need remains for a cable assembly that overcomes these and other problems with known cable assemblies. A need remains for a cable assembly that can accommodate multiple cables in a common housing. A need remains for a cable assembly that has a reduced footprint and shorter overall length.

BRIEF DESCRIPTION OF THE INVENTION

In one embodiment, a cable assembly is provided including a housing having a mating end and a cable end and receives a cable through the cable end. The housing has a mounting block proximate to the cable end. A ferrule is configured to be terminated to the cable. The ferrule has an inner bushing and an outer bushing, with the inner and outer bushings cooperating to capture a cable braid of the cable therebetween. The ferrule is retained within the mounting block such that the ferrule is housed interior of the housing.

In another embodiment, a cable assembly is provided including a housing having a mating end and a cable end and being configured to receive a cable through the cable end. The housing has a mounting block proximate to the cable end that has a channel formed therein and a slot formed therein axially offset from the channel. A ferrule is configured to be terminated to the cable, where the ferrule has a lip received within the channel and held in the housing by the channel. A retainer is configured to be coupled to the cable proximate to an end of the cable. The retainer has tabs extending outward therefrom that are received in the slot and held in the housing by the slot.

In a further embodiment, a cable assembly is provided including a housing having a mating end and a cable end. The housing is configured to receive a cable through the cable end. The housing has a mounting block proximate to the cable end that has a slot formed therein. A first cable retainer is configured to be coupled to a first cable having a first diameter, where the first cable retainer is coupled proximate to an end of the first cable. The first cable retainer has an outer envelope and a first inner diameter corresponding to the first diameter of the first cable. A second cable retainer is configured to be coupled to a second cable having a second diameter. The second cable retainer is coupled proximate to an end of the second cable, where the second cable retainer has an outer envelope and a second inner diameter that is different than the first inner diameter. The second inner diameter corresponds to the second diameter of the second cable. The outer envelope of the first and second cable retainers are substantially similar to each other such that both the first and second cable retainers are configured to be securely retained in the slot of the mounting block of the housing.

DETAILED DESCRIPTION OF THE INVENTION

Figure 1:
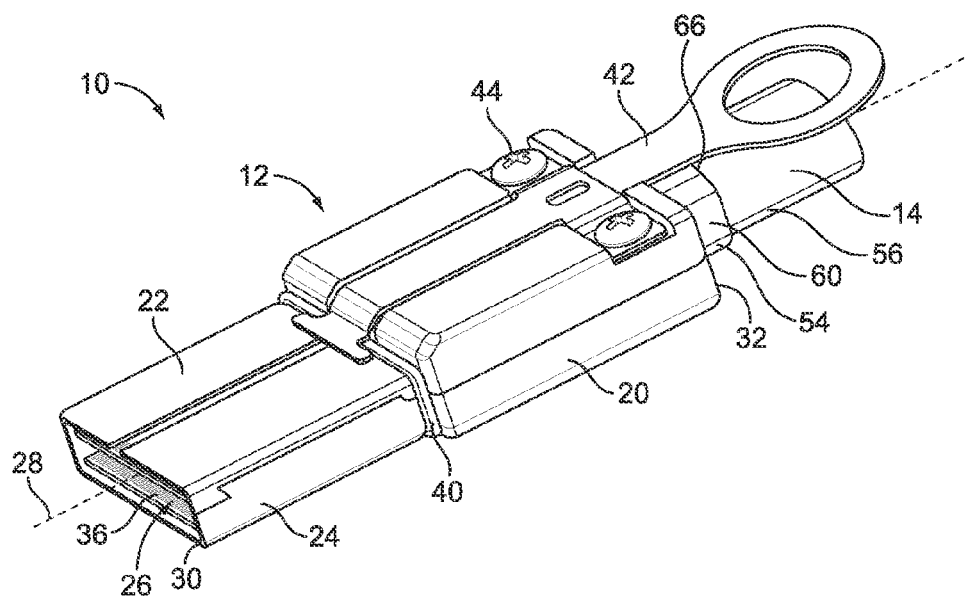
FIG. 1 is a front perspective view of a cable assembly formed in accordance with an exemplary embodiment.
Figure 2:
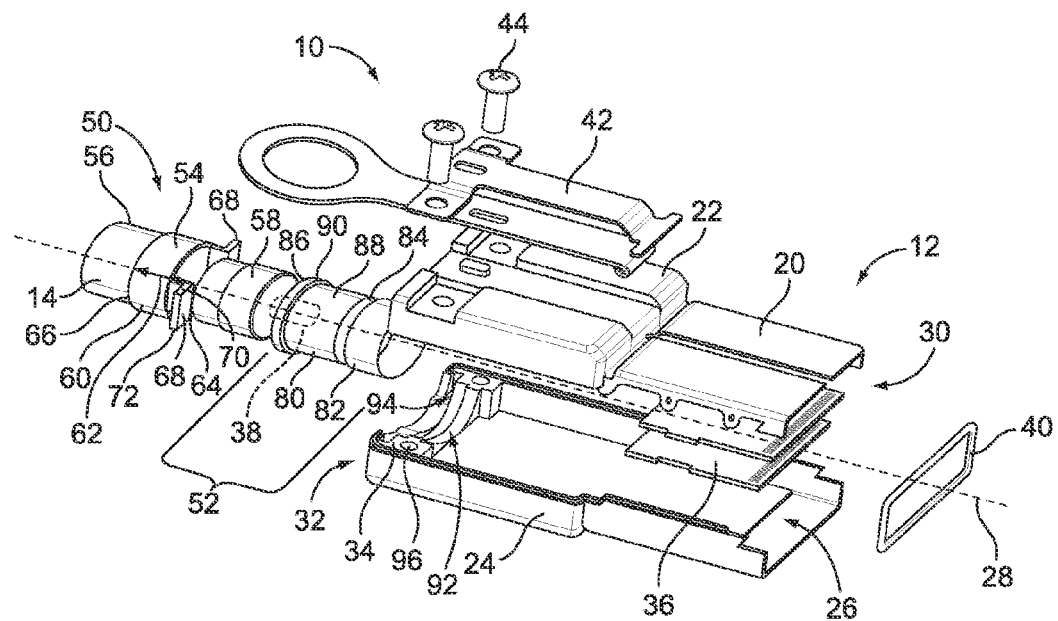
FIG. 2 is an exploded view of the cable assembly.

FIG. 1 is a front perspective view of a cable assembly 10 formed in accordance with an exemplary embodiment. FIG. 2 is an exploded view of the cable assembly 10. The cable assembly 10 includes a connector 12 mounted to an end of a cable 14. In the illustrated embodiment, the connector 12 represents a transceiver. The connector 12 may be a fiber optic based or a copper based transceiver. The connector 12 is configured to be pluggably connected to an electronic device, such as into a circuit board mounted receptacle connector or into a cable mounted receptacle connector. Optionally, the connector 12 may be constructed according to a particular standard, such as the Small Form-factor Pluggable (SFP) module standard, defining size and compatibility requirements. In alternative embodiments, the subject matter herein may be used in other types of cable mounted connectors other than transceivers.

The cable assembly 10 includes a housing 20 having an upper shell 22 and a lower shell 24 coupled together to define a cavity 26 therebetween. The cavity 26 extends along a longitudinal axis 28 between a mating end 30 and a cable end 32. The housing 20 has a mounting block 34 positioned between the cable end 32 and the mating end 30. The mounting block 34 is configured to mount the housing 20 to the cable 14. The mounting block 34 includes features to secure the relative position of the cable 14 with respect to the housing 20. In an exemplary embodiment, the mounting block 34 is positioned proximate to the cable end 32. Optionally, the mounting block 34 may be positioned at the cable end 32, as in the illustrated embodiment.

The cable assembly 10 includes one or more circuit board (s) 36 received in the cavity 26 proximate to the mating end 30. The circuit boards 36 define a mating interface for mating with a mating connector. The circuit boards 36 are terminated to one or more conductor(s) 38 of the cable 14. For example, the cable 14 may include a center conductor terminated to one or more of the circuit boards 36. In an alternative embodiment, rather than circuit boards 36, the cable assembly 10 may include individual contacts arranged proximate to the mating end 30 for mating with a corresponding mating connector. The individual contacts may be terminated to ends of individual wires of the cable 14.

In an exemplary embodiment, the cable assembly 10 includes a gasket 40 coupled to the housing 20. The gasket 40 may provide electromagnetic shielding or other types of shielding when the connector 12 is mated with the mating connector. The cable assembly 10 includes a latch 42 for securely coupling the connector 12 to the mating connector. The latch 42 may be secured to the housing 20 using fasteners 44. The fasteners 44 may also be used to securely couple the upper shell 22 to the lower shell 24.

The cable 14 is secured to the connector 12 using a cable securing sub-assembly 50. The cable securing sub-assembly 50 includes a ferrule 52 and a retainer 54. The retainer 54 is separate from the ferrule 52 and operates separately from the ferrule 52 to secure the cable 14 to the housing 20. The retainer 54 engages an outer jacket 56 of the cable 14 to secure the jacket 56 relative to the housing 20. The ferrule 52 engages a cable braid 58 of the cable 14 to secure the cable braid 58 to the housing 20. The ferrule 52 also electrically connects, and grounds, the housing 20 to the cable braid 58.

The retainer 54 includes a strain relief portion 60 extending axially along the cable 14 for a length 62. Optionally, the strain relief portion 60 may engage the jacket 56 along the entire length 62. The strain relief portion 60 extends between a front end 64 and a rear end 66. The retainer 54 is physically secured to the cable 14 between the front end 64 and the rear end 66 to maintain the relative position of the retainer 54 with respect to the cable 14. The retainer 54 includes a pair of tabs 68 extending radially outward from the cable 14. The tabs 68 are configured to engage the housing 20 to secure the axial position of the retainer 54 with respect to the housing 20. The tabs 68 may be rectangular in shape having opposite edges 70, 72. The edges 72 are configured to engage the housing 20 to maintain a rotational position of the retainer 54 with respect to the housing 20. As such, the tabs 68 may define anti-rotation features. More or less than two tabs 68 may be provided in alternative embodiments. For example, a single tab 68 may be provided extending at least partially circumferentially around the cable 14. Optionally, the single tab 68 may extend entirely circumferentially around the cable 14, defining a flange.

In an exemplary embodiment, the retainer 54 is manufactured from a dielectric material, such as a plastic or a rubber material. The retainer 54 is secured to the jacket 56 during an overmolding process. In an alternative embodiment, the retainer 54 is secured to the jacket 56 by a bonding operation. The retainer may be secured to the jacket 56 by other processes in other alternative embodiments. Optionally, rather than being manufactured from a dielectric material, the retainer 54 may be manufactured from a metal material. The retainer 54 may be secured to the jacket 56 by a crimping operation.

The ferrule 52 includes an inner bushing 80 and an outer bushing 82. The inner bushing 80 extends between a front end 84 and a rear end 86. The inner and outer bushings 80, 82 cooperate to capture the cable braid 58 therebetween. During assembly, the cable 14 is prepared by exposing the cable braid 58. The inner bushing 80 is loaded over the cable braid 58 and then the cable braid 58 is folded back over the front end 84 onto an outer surface 88 of the inner bushing 80. The outer bushing 82 is then loaded over the cable braid 58. The cable braid 58 is captured between the inner and outer bushings 80, 82. The cable braid 58 is electrically connected to the inner and outer bushings 80, 82 by the engagement thereto. The ferrule 52 may then be electrically connected to the housing 20 when coupled thereto to electrically common the housing 20 and the cable braid 58. The cable braid 58 may be captured by an interference connection, where the cable braid 58 and/or the inner bushing 80 are at least partially compressed and held by the outer bushing 82. Optionally, the outer bushing 82 may be pressed or crimped onto the cable braid 58 to secure the outer bushing 82 to the cable braid 58 and the inner bushing 80.

In an exemplary embodiment, the ferrule 52 is knurled. For example, the inner bushing 80 may include a lip or rim 90 at the rear end 86. The lip 90 extends circumferentially around the inner bushing 80. Alternatively, the outer bushing 82 may include a lip or rim. In other alternative embodiments, the inner and/or outer bushings 80 and/or 82 may include fingers or tabs extending therefrom. The knurled portion of the ferrule 52 is configured to engage the housing 20 to hold the ferrule 52 within the housing 20.

In an exemplary embodiment, the mounting block 34 of the housing 20 includes a channel 92 that receives the ferrule 52 and slots 94 that receive the retainer 54. The channel 92 is positioned forward of the slots 94. The channel 92 is provided in both the upper and lower shells 22, 24. Optionally, the channel 92 extends circumferentially around the cavity 26. Alternatively, the channel 92 may extend only partially circumferentially around the cavity 26. The lip 90 is received in the channel 92 formed in the mounting block 34 to secure the ferrule 52 within the mounting block 34. The slots 94 are positioned rearward of the channel 92. The slot 94 is provided in both the upper and lower shells 22, 24. The tabs 68 are received in the slots 94 formed in the mounting block 34 to secure the retainer 54 within the mounting block 34. Optionally, the slots 94 may be rectangular in shape extending radially outward from the cavity 26 toward the sides of the housing 20. Alternatively, a single slot may be provided that extends entirely circumferentially around the cavity 26. The mounting block 34 may include mounting openings 96 that receive the fasteners 44.

Figure 3:
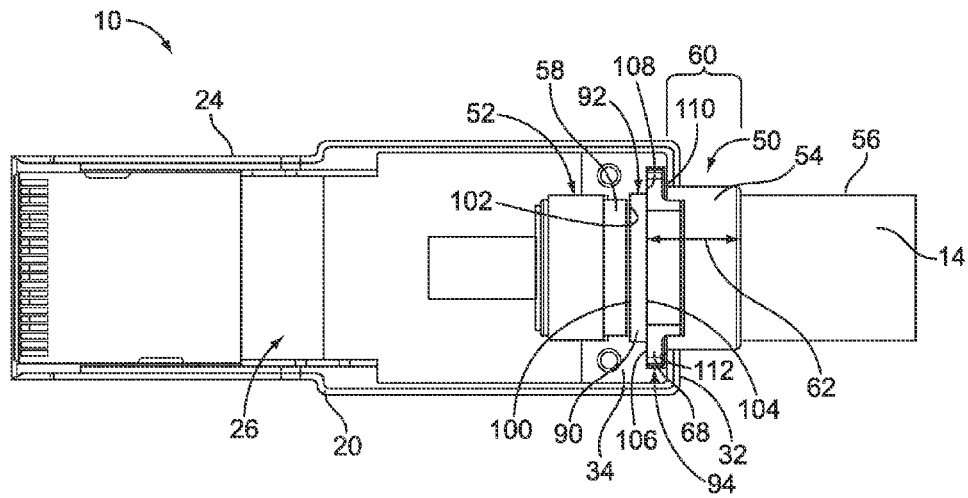
FIG. 3 illustrates a bottom half of the cable assembly.

FIG. 3 illustrates a bottom half of the cable assembly 10 showing the lower shell 24 with the cable 14 loaded into the cavity 26. The ferrule 52 is terminated to the cable 14 and cable braid 58. When assembled, the ferrule 52 and retainer 54 are loaded into the mounting block 34. The ferrule 52 is entirely positioned interior of the housing 20 within the cavity 26. As such, the electrical termination of the cable securing sub-assembly 50 to the cable braid 58 is accomplished within the housing 20, as opposed to external of the housing 20.

Having the termination within the housing 20 shortens the effective length of the cable assembly 10.

The lip 90 is loaded into the channel 92. A front surface 100 of the lip 90 engages a front shoulder 102 of the channel 92. The front shoulder 102 limits axial movement of the ferrule 52 in a forward direction. Optionally, the mounting block 34 may include a rear shoulder that engages a rear surface 104 of the lip 90. The rear surface 104 may be aligned with the rear end 86 (shown in FIG. 2). The rear surface 104 and/or rear end 86 may engage the retainer 54 to limit rearward movement of the ferrule 52.

When assembled, the tabs 68 are loaded into the slots 94 to secure the cable 14 within the housing 20. The tabs 68 include front surfaces 106 that engage front shoulders 108 of the slots 94. The tabs 68 include rear surfaces 110 that engage rear shoulders 112 of the slots 94. The front and rear shoulders 108, 112 limit axial movement of the retainer 54 in forward and rearward directions, respectively. The strain relief portion 60 extends rearward from the tabs 68. At least a portion of the strain relief portion 60 is provided interior of the housing 20 and at least a portion of the strain relief portion 60 is provided exterior of the housing 20. The strain relief portion 60 protects the cable from engaging the exit of the housing 20, which could damage the cable 14, such as by cutting the jacket 56. The strain relief portion 60 may be relatively short such that the portion external of the housing 20 does not extend very far from the cable end 32. In the illustrated embodiment, the length 62 of the strain relief portion 60 is approximately equal to a length of the ferrule 52. In alternative embodiments, the length 62 may be shorter than the length of the ferrule 52.

Figure 4:
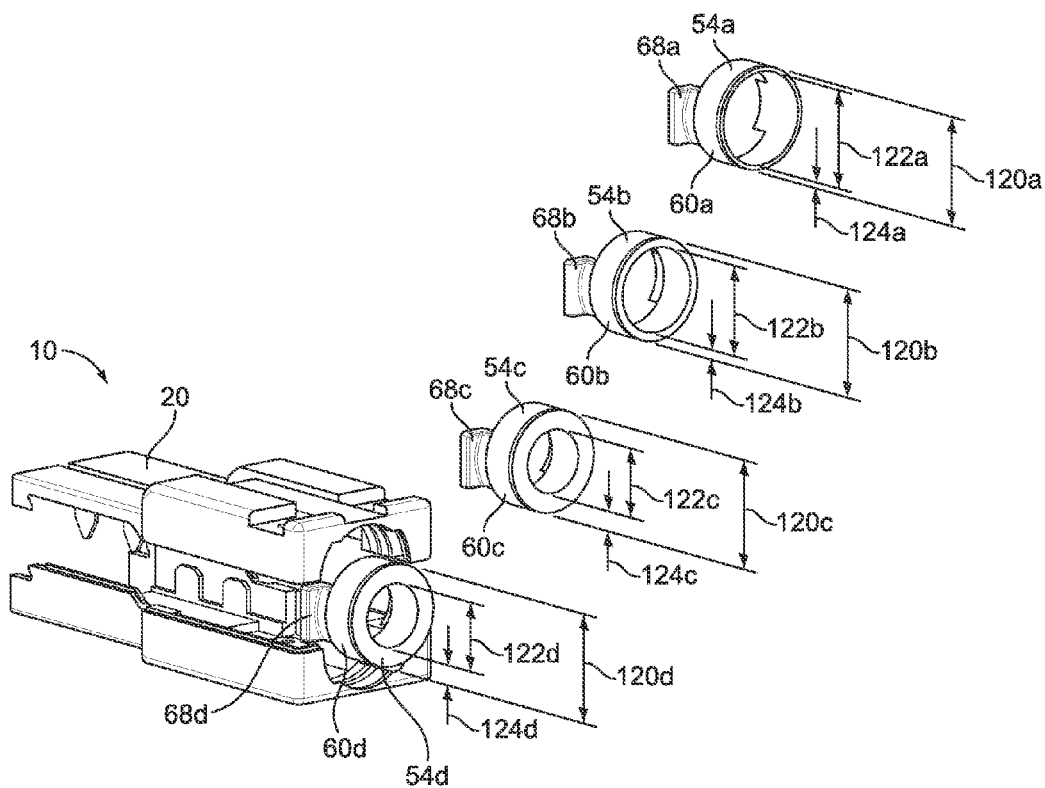
FIG. 4 is a rear perspective view of the cable assembly illustrating different retainers for use with the cable assembly.

FIG. 4 is a rear perspective view of the cable assembly 10 illustrating different retainers 54a, 54b, 54c, 54d for use with the cable assembly 10. Each of the retainers 54a, 54b, 54c, 54d is configured to be used with the same housing 20. For example, each of the retainers 54a, 54b, 54c, 54d has a substantially similar outer envelope, defined by the strain relief portions 60a, 60b, 60c, 60d, respectively, and tabs 68a, 68b, 68c, 68d, respectively. The retainers 54a, 54b, 54c, 54d have similar lengths and the strain relief portions 60a, 60b, 60c, 60d have outer diameters 120a, 120b, 120c, 120d that are substantially similar. The outer envelopes may be identical in some embodiments.

The retainers 54a, 54b, 54c, 54d are configured to be coupled to different cables 14 (shown in FIG. 1) having different cable gauges and thus different cable diameters. The retainers 54a, 54b, 54c, 54d have different inner diameters 122a, 122b, 122c, 122d. The inner diameters 122a, 122b, 122c, 122d correspond to the cable diameter and the particular retainer 54a, 54b, 54c, 54d is selected to correspond to the particular cable 14. The retainers 54a, 54b, 54c, 54d have different thicknesses 124a, 124b, 124c, 124d measured between the inner diameters 122a, 122b, 122c, 122d and the outer diameters 120a, 120b, 120c, 120d. Each of the retainers 54a, 54b, 54c, 54d is able to be loaded into the housing 20, and thus the housing 20 is configured to be terminated to ends of different sized cables. The retainers 54a, 54b, 54c, 54d may be coupled to fiber optic cables or copper cables. During assembly, the cable retainers 54a, 54b, 54c, 54d are selectively received in the housing 20 such that only one of the retainers 54a, 54b, 54c, 54d and corresponding cable are configured for use with the housing 20 at a particular time. The retainers 54a, 54b, 54c, 54d are used in the alternative, wherein only one of the retainers 54a, 54b, 54c, 54d and corresponding cable are terminated to the housing 20 at a particular time.

Figure 5:
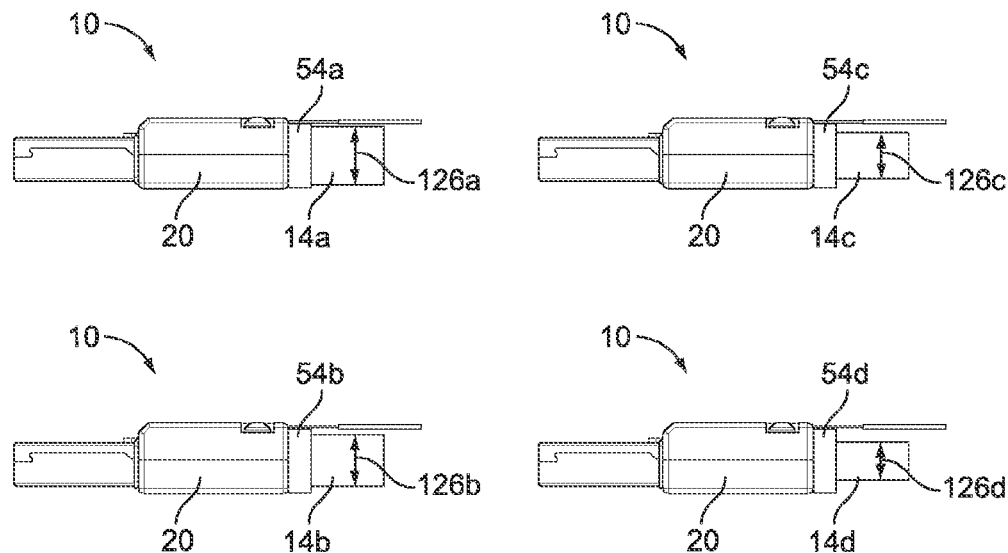
FIG. 5 is a side view of the cable assembly being used with different diameter cables.

FIG. 5 is a side view of the cable assembly 10 being used with cables 14a, 14b, 14c, 14d having different outer diameters 126a, 126b, 126c, 126d. The outer diameters 126a, 126b, 126c, 126d correspond to the inner diameters 122a, 122b, 122c, 122d (shown in FIG. 4) of the retainers 54a, 54b, 54c, 54d. The retainers 54a, 54b, 54c, 54d hold the different diameter cables 14a, 14b, 14c, 14d within the housing 20. As such, the same housing 20 can be used with multiple different cables 14a, 14b, 14c, 14d. The cables 14a, 14b, 14c, 14d may be copper based cables or fiber optic based cables. In the illustrated embodiment, the cable 14a is a 26 AWG cable; the cable 14b is a 28 AWG cable; the cable 14c is a 30 AWG cable; and the cable 14d is a 32 AWG cable. Other sizes of cables may be used in alternative embodiments. The housing 20 may be adapted to accommodate more than 4 different cable sizes, by having different retainers other than the retainers 54a, 54b, 54c, 54d.

Figure 6:
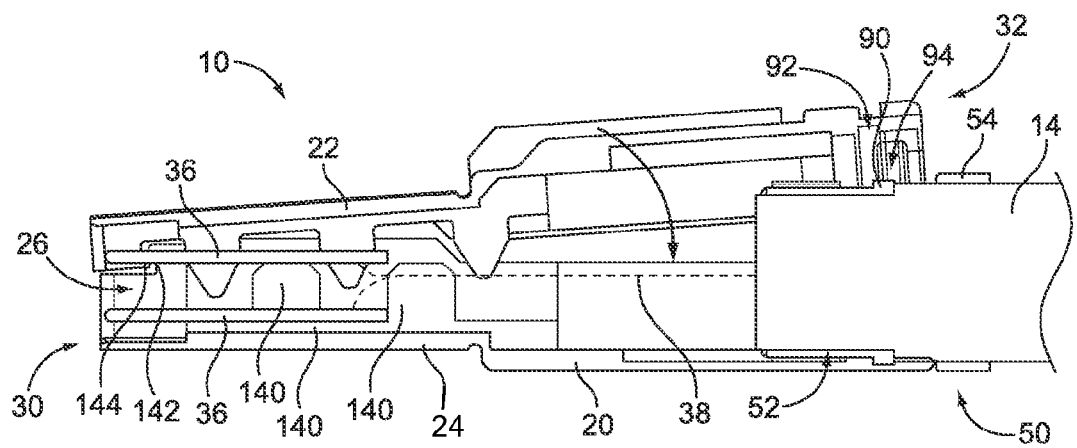
FIG. 6 is a partial sectional view of the cable assembly during an assembly step.

FIG. 6 is a partial sectional view of the cable assembly 10 during an assembly step. Once the cable 14 and cable securing sub-assembly 50 are loaded into the lower shell 24, the circuit boards 36 are loaded into the cavity 26. The housing 20 includes alignment features 140 for aligning the circuit boards 36 with respect to the upper and lower shells 22, 24. The alignment features 140 may include lands or shelves that support the circuit boards 36 at a particular height within the cavity 26. The alignment features 140 may include fingers or tabs that position the circuit boards 36 longitudinally and/or laterally within the cavity 26. Optionally, both circuit boards 36 may be loaded into the lower shell 24 prior to the upper shell 22 being coupled to the lower shell 24. The conductor 38 (represented schematically in FIG. 6) of the cable 14 may be terminated to the circuit boards 36. The conductor 38 may be copper or fiber optic. In an alternative embodiment, one circuit board may be loaded into the lower shell 24 and the other circuit board 36 loaded into the upper shell 22, wherein the upper shell 22 and corresponding circuit board 36 are simultaneously coupled to the lower shell 24.

During assembly, the upper shell 22 may be rotated into position with respect to the lower shell 24. For example, the mating ends 30 may be connected and then the cable end 32 of the upper shell 22 is lowered into position onto the cable end 32 of the lower shell 24. A catch surface 142 at the mating end 30 of the lower shell 24 may capture a corresponding catch surface 144 of the upper shell 22 to secure the mating ends 30 of the upper and lower shells 22, 24. The fasteners 44 (shown in FIGS. 1 and 2) are used to secure the cable ends 32 of the upper and lower shells 22, 24. When the upper shell 22 is lowered onto the lower shell 24, the channel 92 of the upper shell 22 is lowered onto the lip 90 of the ferrule 52. As such, the lip 90 is captured in the channels 92 of the upper and lower shells 22, 24. Similarly, the slot 94 of the upper shell 22 is lowered onto the tabs 68 (shown in FIG. 2). As such, the tabs 68 of the retainer 54 are captured in the slots 94 of the upper and lower shells 22, 24.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A cable assembly comprising:
   a housing having a mating end and a cable end, the housing being configured to receive a cable through the cable end, the housing having a mounting block proximate to the cable end, the mounting block having a slot;
   a ferrule configured to be terminated to the cable, the ferrule having an inner bushing and an outer bushing, the inner and outer bushings cooperating to capture a cable braid of the cable therebetween, the ferrule being retained within the mounting block such that the ferrule is housed interior of the housing; and
   a retainer, discrete from the housing and from the ferrule, being configured to be coupled to the cable rearward of the ferrule, the retainer having tabs being received in the slot to securely position the retainer with respect to the housing.

2. The cable assembly of claim 1, wherein the inner bushing has a front end and a rear end, the inner bushing having a lip at the rear end, the lip being received in a channel formed in the mounting block to secure the ferrule within the mounting block.

3. The cable assembly of claim 1, wherein the mounting block has a circumferential channel, the inner bushing having a lip received in the channel to hold the relative position of the ferrule within the housing.

4. The cable assembly of claim 1, wherein the housing has a cavity, the ferrule being received in the cavity.

5. The cable assembly of claim 1, the retainer having a strain relief portion extending along the cable, at least a portion of the strain relief portion being interior of the housing, at least a portion of the strain relief portion being exterior of the housing.

6. The cable assembly of claim 1, wherein
   the retainer comprises a first cable retainer configured to be coupled to a first cable having a first diameter, the first cable retainer being coupled proximate to an end of the first cable, the first cable retainer having an outer envelope and a first inner diameter corresponding to the first diameter of the first cable; and the cable assembly further comprising
   a second cable retainer configured to be coupled to a second cable having a second diameter, the second cable retainer being coupled proximate to an end of the second cable, the second cable retainer having an outer envelope and a second inner diameter that is different than the first inner diameter, the second inner diameter corresponding to the second diameter of the second cable;
   wherein the first and second cable retainers are selectively coupled to the housing to secure either the first cable or the second cable, respectively, to the housing, the outer envelopes of the first and second cable retainers being substantially similar to each other such that both the first and second cable retainers are configured to be securely retained in a slot formed in the mounting block of the housing.

7. The cable assembly of claim 1, wherein the mounting block is positioned between the mating end and the cable end.

8. The cable assembly of claim 1, wherein the ferrule is entirely positioned interior of the housing.

9. The cable assembly of claim 1, wherein the housing has a cavity, the cable assembly further comprising a circuit board received in the cavity and positioned proximate to the mating end for mating engagement with a mating connector, the circuit board being configured to be electrically coupled to a conductor of the cable.

10. A cable assembly comprising:
    a housing having a mating end and a cable end, the housing being configured to receive a cable through the cable end, the housing having a mounting block proximate to the cable end, the mounting block having a channel formed therein and a slot formed therein axially offset from the channel;
    a ferrule configured to be terminated to the cable, the ferrule having an inner bushing and an outer bushing, the inner and outer bushings cooperating to capture a cable braid of the cable therebetween, the ferrule having a lip received within the channel and held in the housing by the channel; and
    a retainer, discrete from the housing and from the ferrule, configured to be coupled to the cable proximate to an end of the cable, the retainer having tabs extending outward therefrom, the tabs being received in the slot and held in the housing by the slot.

11. The cable assembly of claim 10, wherein the ferrule is retained within the mounting block such that the ferrule is housed interior of the housing.

12. The cable assembly of claim 10, wherein the inner bushing has the lip received in the channel to hold the relative position of the ferrule within the housing.

13. The cable assembly of claim 10, wherein the retainer is configured to be coupled to the cable rearward of the ferrule, the retainer having a strain relief portion extending along the cable, at least a portion of the strain relief portion being interior of the housing, at least a portion of the strain relief portion being exterior of the housing.

14. A cable assembly comprising:
    a housing having a mating end and a cable end, the housing being configured to receive a cable through the cable end, the housing having a mounting block proximate to the cable end, the mounting block having a slot formed therein;
    a first cable retainer configured to be coupled to a first cable having a first diameter, the first cable retainer being coupled proximate to an end of the first cable, the first cable retainer having an outer envelope and a first inner diameter corresponding to the first diameter of the first cable; and
    a second cable retainer configured to be coupled to a second cable having a second diameter, the second cable retainer being coupled proximate to an end of the second cable, the second cable retainer having an outer envelope and a second inner diameter that is different than the first inner diameter, the second inner diameter corresponding to the second diameter of the second cable;
    wherein the outer envelopes of the first and second cable retainers are substantially similar to each other such that both the first and second cable retainers are configured to be securely retained in the slot of the mounting block of the housing;

wherein a first ferrule is configured to be terminated to the first cable, the first ferrule having an inner bushing and an outer bushing, the inner and outer bushings cooperating to capture a cable braid of the first cable therebetween, the first ferrule being retained within the mounting block such that the first ferrule is housed interior of the housing; and a second ferrule is configured to be terminated to the second cable, the second ferrule having an inner bushing and an outer bushing, the inner and outer bushings cooperating to capture a cable braid of the second cable therebetween, the second ferrule being retained within the mounting block such that the second ferrule is housed interior of the housing;

wherein the first and second ferrules are selectively received in the housing such that either the first cable or the second cable, respectively, is coupled to the housing.

15. The cable assembly of claim 14, wherein the first and second cable retainers are selectively received in the housing such that either the first cable or the second cable are configured for use with the housing.

16. The cable assembly of claim 14, wherein the first and second cable retainers are configured to be used in the alternative, wherein either the first cable retainer and corresponding first cable are terminated to the housing or the second cable retainer and corresponding second cable are terminated to the housing.

17. The cable assembly of claim 14, wherein the outer envelopes of the first and second cable retainers are defined by an outer diameter and tabs extending outward from the outer diameter, the first cable retainer having a first thickness measured between the first inner diameter and the outer diameter, the second cable retainer having a second thickness measured between the second inner diameter and the outer diameter, the second thickness being greater than the first thickness.

18. The cable assembly of claim 14, wherein the first cable retainer is configured to be secured to a jacket of the first cable during an overmolding process, the second cable retainer is configured to be secured to a jacket of the second cable during an overmolding process.

19. The cable assembly of claim 14, wherein the first cable retainer includes a front end and a rear end, the front end includes tabs extending outward therefrom, the tabs being received in the slot, the first cable retainer extending from the cable end of the housing such that the rear end is positioned exterior of the housing.

* * * * *